(12) United States Patent
Choi et al.

(10) Patent No.: US 11,881,162 B2
(45) Date of Patent: Jan. 23, 2024

(54) IMAGE MODIFICATION FOR UNDER-DISPLAY SENSOR

(71) Applicant: Google LLC, Mountain View, CA (US)

(72) Inventors: Sangmoo Choi, Palo Alto, CA (US);
Xiaoping Bai, Pleasanton, CA (US);
Chien-Hui Wen, Cupertino, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/995,923

(22) PCT Filed: Aug. 31, 2020

(86) PCT No.: PCT/US2020/048830
§ 371 (c)(1),
(2) Date: Oct. 10, 2022

(87) PCT Pub. No.: WO2022/010510
PCT Pub. Date: Jan. 13, 2022

(65) Prior Publication Data
US 2023/0186846 A1 Jun. 15, 2023

Related U.S. Application Data

(60) Provisional application No. 63/048,492, filed on Jul. 6, 2020.

(51) Int. Cl.
*G09G 3/3225* (2016.01)
*G06V 10/60* (2022.01)
*H04N 23/57* (2023.01)

(52) U.S. Cl.
CPC ........... *G09G 3/3225* (2013.01); *G06V 10/60* (2022.01); *H04N 23/57* (2023.01);
(Continued)

(58) Field of Classification Search
CPC ......... G09G 3/3225; G09G 2320/0686; G09G 2354/00; G09G 2360/144; G06V 10/60; H04N 23/57
See application file for complete search history.

(56) References Cited

U.S. PATENT DOCUMENTS

2007/0229435 A1* 10/2007 Lee ...................... G09G 3/2011
345/98
2018/0025521 A1* 1/2018 Allen ................... H04N 13/344
345/589
(Continued)

FOREIGN PATENT DOCUMENTS

WO 2019201046 A1 10/2019
WO 2020074696 A1 4/2020

OTHER PUBLICATIONS

Response to Communication Pursuant to Rules 161(1) and 162 EPC dated Jan. 13, 2022, from counterpart European Application No. 20771724.0, filed Apr. 5, 2023, 15 pp.
(Continued)

*Primary Examiner* — Premal R Patel
(74) *Attorney, Agent, or Firm* — Shumaker & Sieffert, P.A.

(57) ABSTRACT

In general, techniques are described for image modification for under-display sensors. A computing device comprising a display, one or more sensors positioned underneath the display, and one or more processors may be configured to perform various aspects of the techniques. The display may be configured to allow the one or more sensors to operate through the display. The one or more processors may be configured to determine an ambient light level, and modify, based on the ambient light level, an area of an image to obtain a modified image. The area of the image may correspond to pixels of the display positioned above the one or more sensors or correspond to pixels of the display that
(Continued)

are not positioned above the one or more sensors. The one or more processors may then interface, with the display, to output the modified image.

20 Claims, 6 Drawing Sheets

(52) U.S. Cl.
CPC . *G09G 2320/0686* (2013.01); *G09G 2354/00* (2013.01); *G09G 2360/144* (2013.01)

(56) References Cited

U.S. PATENT DOCUMENTS

| | | | |
|---|---|---|---|
| 2018/0061313 | A1 | 3/2018 | Jang et al. |
| 2019/0013333 | A1* | 1/2019 | Inoue ................. H01L 27/1259 |
| 2019/0130822 | A1 | 5/2019 | Jung et al. |
| 2019/0278967 | A1 | 9/2019 | Shepelev et al. |
| 2020/0342800 | A1* | 10/2020 | Li ........................ G06F 1/1637 |
| 2021/0012081 | A1* | 1/2021 | Guo ........................ G06F 21/32 |

OTHER PUBLICATIONS

International Search Report and Written Opinion of International Application No. PCT/US2020/048830, dated Mar. 11, 2021, 19 pp.
International Preliminary Report on Patentability from International Application No. PCT/US2020/048830 dated Jan. 19, 2023, 14 pp.

\* cited by examiner

IMAGE MODIFICATION FOR UNDER-DISPLAY SENSOR

This application claims the benefit of U.S. Provisional Application Ser. No. 63/048,492, filed Jul. 6, 2020, and entitled "IMAGE MODIFICATION FOR UNDER-DISPLAY SENSOR," the entire contents of which are hereby incorporated by reference as if set forth in their entirety herein.

BACKGROUND

Computing devices, such as cellular phones and so-called smartphones, may include a display by which to present images (including sequences of images forming videos, animations, etc. and/or computer-generated user interfaces and other forms of images). As smartphones and other types of power-limited devices, such as laptop computers, smartwatches, smart-glasses, smart-hubs, extended reality (XR) devices, and the like, may consume power from power limited sources, such as a battery, these power-limited devices may employ more power-efficient displays, such as organic light emitting diode (OLED) displays (including active-matrix OLED—AMOLED displays), compared to ordinary LED displays and other types of displays, such as liquid crystal displays (LCDs), etc.

Further, to provide for a more comfortable viewing experience, the power-limited devices may employ larger displays. To increase the size of displays, various sensors may be configured to operate underneath the display (which may be referred to as "under-display sensors"), and thereby avoid notches, holes, or other modification to the display that detract from the viewing experience. While the size and shape of displays that allow for under-display sensors (which may be referred to as "pass-through displays") may improve compared to displays having notches, holes, or other modifications (which may be referred to as "modified displays"), the pass-through displays may present images that include more optical artifacts compared to images presented by the modified displays.

SUMMARY

Various aspects of the techniques are directed to a computing device configured to perform image modification in an area of a display (such as an organic light emitting diode—OLED—display or active matrix OLED—AMOLED—display) above an under-display sensor. That is, the computing device may include a pass-through display in which sensors may operate underneath the pass-through display and which may enable a larger display area than modified displays. Rather than present an image that includes noise or optical artifacts as a result of various opto-electrical effects from allowing sensors to operate through the display, the computing device may be configured to modify the image for pixels in the area in the display above and/or adjacent to the under-display sensor to potentially reduce or remove the noise or optical artifacts, thereby potentially improving the viewing experience compared to computing devices that perform no image adjustment. Such modification may thereby improve operation of the device in that an optical image artifact may be reduced while still having the high screen-to-body ratio of pass-through displays.

In one example, various aspects of the techniques are directed to a computing device comprising: a display; one or more sensors positioned underneath the display, the display configured to allow the one or more sensors to operate through the display; one or more processors configured to: determine an ambient light level; modify, based on the ambient light level, an area of an image to obtain a modified image, the area of the image corresponding to pixels of the display positioned above the one or more sensors or corresponding to pixels of the display that are not positioned above the one or more sensors; and interface, with the display, to output the modified image.

In another example, various aspects of the techniques are directed to a method comprising: determining, by one or more processors, an ambient light level; modifying, by the one or more processors and based on the ambient light level, an area of an image to obtain a modified image, the area of the image corresponding to pixels of display positioned above one or more sensors or corresponding to pixels of the display that are not positioned above the one or more sensors, the display configured to allow the one or more sensors to operate through the display; and interfacing, with the display, to output the modified image.

In another example, various aspects of the techniques are directed to a non-transitory computer-readable storage media having stored thereon instructions that, when executed, cause one or more processors to: determine an ambient light level; modify, based on the ambient light level, an area of an image to obtain a modified image, the area of the image corresponding to pixels of display positioned above one or more sensors or corresponding to pixels of the display that are not positioned above the one or more sensors, the display configured to allow the one or more sensors to operate through the display; and interface, with the display, to output the modified image.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

A pass-through display may allow one or more sensors to operate underneath the display, in which the sensor signals may pass-through various layers of the pass-through display. To facilitate the pass-through nature of the pass-through display various back coverings on the pass-through display may be omitted during construction of the pass-through display at locations above and/or adjacent to a location of the sensors under the pass-through display. That is, the pass-through display may include a back cover formed from foam (or other types of cushions) and copper (Cu) films that are removed in areas of the back cover above and/or adjacent to the sensor location. The omission of the back cover allows the sensor signals to pass through the display, where examples of such sensors include ambient light sensors, cameras, fingerprint sensors, proximity sensors, or other types of optical sensors, electromagnetic sensors, etc.

Because the back cover is omitted in certain locations, the pass-through display may experience opto-electrical effects in terms of light reflecting off of the sensor and potentially other layers below semiconductor layers of the pass-through display and impacting operation of the semiconductors forming the pixels of the pass-through display. In other words, the reflected light may change a voltage of various transistors that results in leakage current that effectively decreases a luminosity of one or more pixels of the pass-through display above and/or adjacent to the sensor. The decreased luminosity due to the opto-electrical effect may cause noise or optical artifacts into an image (e.g. dim spots) when presented by the pass-through display that is visible to a user.

Various aspects of the techniques described in this disclosure may modify the image prior to being output by the pass-through display to potentially reduce or remove the noise or optical artifacts when presented by the pass-through display. A computing device that is configured to interface with the pass-through may determine an ambient light level and then modify, based on the ambient light level, an area of an image to obtain a modified image. The computing device may modify the area of the image corresponding to pixels of the display positioned above the one or more sensors. The computing device may store or otherwise implement a lookup table (LUT) that associates various ambient light levels to luminance modifications. Using the ambient light level as a key to the LUT, the computing device may determine one or more luminance modifications for the area of the image, applying the luminance modification to increase a luminance of the area of the image to potentially reduce or remove the noise or optical artifacts due to the opto-electrical effect. The computing device may then interface with the display to output the modified image.

Figure 1A:
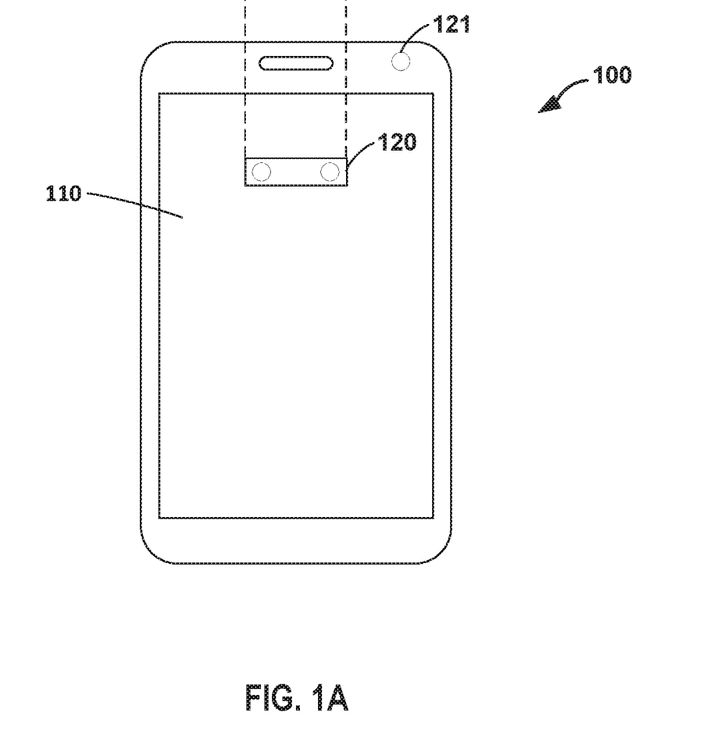
FIGS. 1A and 1B are diagrams illustrating an example computing device configured to perform various aspects of the image modification techniques described in this disclosure.
Figure 1B:
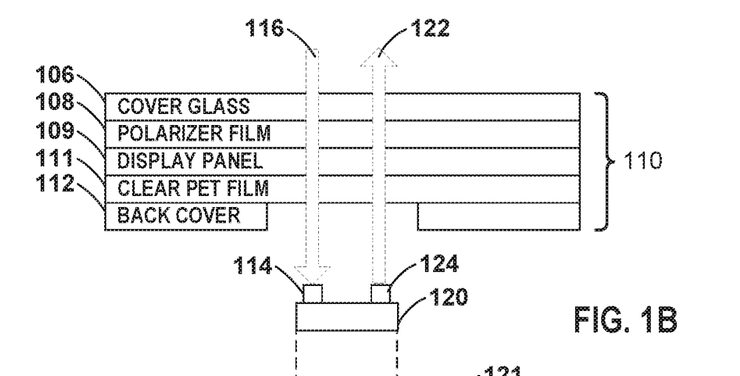

FIGS. 1A and 1B are diagrams illustrating an example computing device 100 configured to perform various aspects of the image modification techniques described in this disclosure. Computing device 100 may include a display 110 and an under-display sensor 120 ("UDS 120"). FIG. 1A illustrates a front perspective view of computing device 100. FIG. 1B illustrates an example cross section view of computing device 100.

Referring first to the example of FIG. 1A, computing device 100 may represent any type of computing device, such as a smart phone, a smart television, a smartwatch, smartglasses, a laptop computer, a handheld game console, a smart hub, a smart display, etc. Display 110 may include an array of light emitting pixels that form a display panel. In operation, display 110 may display an image by activating the light emitting pixels according to image data. Display 110 may be, for example, an active matrix organic light emitting diode (AMOLED) display or other type of OLED display, a light emitting diode (LED) display, and/or liquid crystal displays (LCD). Computing device 100 includes UDS 120 positioned under display 110 when considered from the front perspective as shown in the example of FIG. 1A.

Referring to FIG. 1B, a top layer of the cross section of computing device 100 includes display 110, which represents an arrangement of a cover glass 106, a polarizer film 108, a display panel 109, a clear PET film 111, and a back cover 112 (of display 110, not computing device 100). Polarizer film 108 is arranged under the cover glass 106. Display panel 109, representing an array of light emitting pixels, is arranged under the polarizer film 108, where clear PET film 111 (which represents a type of polyester film) is arranged under display panel 109. Back cover 112 is arranged under clear PET film 111.

UDS 120 is arranged at least partially under display 110. For example, UDS 120 may be located under the display panel 110, from the cross-sectional view of computing device 100. In some examples, UDS 120 may be coupled to a motherboard or other logic circuitry of computing device 100, while in other examples UDS 120 may be coupled to a back cover 112 of the display 110.

UDS 120 may include an emitter 124 and a receiver 114. In operation, emitter 124 directs electromagnetic radiation, e.g., in the form of a transmitted pulse 122, through the pixel array forming, at least in part, display panel 109. Receiver 114 may receive a returning pulse 116 of electromagnetic energy through the pixel array forming, at least in part, display panel 109.

UDS 120 may represent, for example, an infrared (IR) sensor that emits and receives electromagnetic energy in the IR band of the electromagnetic spectrum. As such, UDS 120 may represent a near IR sensor or a short-wavelength IR sensor. Further, UDS 120 may, in some examples, represent a UV sensor, a LIDAR sensor, an ambient light sensor, a fingerprint sensor, or a RADAR sensor. In some examples, UDS 120 may emit and receive electromagnetic energy in a range of bands of the electromagnetic spectrum. UDS 100 may, in some instances, represent more than one electromagnetic sensor 120.

When representative of an electromagnetic sensor, UDS 120 may facilitate, for example, remote and/or wireless control of a device, such as a television, cable box, sound system, gaming system, smart television, smartspeaker, smartwatch, smartglasses, etc. In these electromagnetic examples, UDS 120 may provide IR illumination. When used for IR illumination, UDS 120 may project IR radiation to an area, and receive the IR radiation reflected off objects in the area. In this way, UDS 120 may represent an electromagnetic sensor configured to emit and receive IR radiation in conjunction with a visible light camera to capture images of an area in dark lighting.

When representative of an electromagnetic sensor, UDS 120 emits electromagnetic radiation, e.g., an IR pulse, using emitter 124 configured to interfere with circuits within the pixel array of the display panel 109. IR interference can cause visual display artifacts to appear on display panel 109. For example, IR interference may cause pixel glowing, resulting in a dot appearing on display panel 110 above UDS 120. The dot may appear as a bright dot.

The size, shape, and intensity of the white dot may depend on characteristics of UDS 120. For example, a larger sized emitter 124 may produce more IR interference that results a larger sized white dot to appear. In some examples, a smaller wavelength of electromagnetic radiation may cause additional interference and result in a larger or brighter white dot to be output by pixels adjacent or over UDS 120. UDS 120 may have varying effects on pixels within the pixel array of display panel 109. For example, pixels located in close proximity to the location of UDS 120 (e.g., directly over or adjacent to UDS 120) may experience greater interference than pixels that are further from UDS 120. In some examples, an emitter 124 with a wider field of view may produce larger white dots due to activation of more pixels within display panel 109.

In some instances, UDS 120 may not actively transmit electromagnetic signals through display 110, but instead may sense (without outputting an electromagnetic signals) various signals passing through display 110. For example, when UDS 120 represents a camera, ambient light sensor, or an ultrasonic sensor, UDS 120 may sense light or ultrasonic sound passing through display 110. Such passive sensors may also reflect light that in turn creates an opto-electrical effect on display panel 109.

As such, display 110 may allow one or more sensors to operate underneath display 110, in which the sensor signals and other external signals may pass-through various layers of the display 110 (which may be denoted as a "pass-through display 110"). To facilitate the pass-through nature of pass-through display 110 various back coverings on pass-through display 110 may be omitted during construction of pass-through display 110 at locations above and/or adjacent to a location of UDS 120 under pass-through display 110. That is, pass-through display 110 may include a back cover formed from foam (or other types of cushions) and copper (Cu) films that are removed in areas of back cover above 112 and/or adjacent to a location of UDS 120. The omission of back cover 112 allows the sensor signals and other external signals (e.g., light) to pass through display 110, where examples of such UDS 110 include ambient light sensors, cameras, fingerprint sensors, proximity sensors, or other types of optical sensors, electromagnetic sensors, ultrasonic sensors, etc.

Because back cover 112 is omitted in certain locations, pass-through display 110 may experience opto-electrical effects in terms of light reflecting off of UDS 120 and potentially other layers below semiconductor layers represented by display panel 109 (such as clear PET film 111) of pass-through display 110 and impacting operation of the semiconductors forming the pixels of display panel 109. In other words, the reflected light may change an off-state leakage current of transistors in pixels that results in the decrease of the pixel emission current that effectively decreases a luminosity of one or more pixels forming display panel 109 above and/or adjacent to UDS 120. The decreased luminosity due to the opto-electrical effect may inject noise or optical artifacts into an image when presented by pass-through display 110 that is visible to a user.

In accordance with various aspects of the techniques described in this disclosure, computing device 100 may modify an image prior to being output by pass-through display 110 to potentially reduce or remove the noise or optical artifacts when presented by pass-through display 110. That is, computing device 100 may include pass-through display 110 in which UDS 120 may operate underneath pass-through display 110 and which may enable the use of large displays (e.g. high screen-to-body ratio) compared to other types of displays. Rather than present an image that includes noise or optical artifacts as a result of various opto-electrical effects from allowing UDS 120 to operate through pass-through display 110, computing device 100 may be configured to modify the image for pixels in the area in pass-through display 110 above and/or adjacent to UDS 120 to potentially reduce or remove the noise or optical artifacts, thereby potentially improving the viewing experience compared to computing devices that perform no image adjustment. Such modification may thereby improve operation of the device in that an optical artifact may be reduced while still having the high screen-to-body ratio of pass-through.

In operation, computing device 100 may first determine an ambient light level. Computing device 100 may include an ambient light sensor 121 that determines the ambient light level. While shown in the example of FIG. 1A as being external (not under) pass-through display 110, ambient light sensor (ALS) 121 ("ALS 121") may be configured to operate underneath pass-through display 110. In any event, ALS 121 may detect the ambient light level, which computing device 100 may use when processing image data to be presented via pass-through display 110.

Computing device 100 may modify the area of the image corresponding to pixels of pass-through display 110 positioned above the one or more UDS 120. Computing device 100 may store or otherwise implement a lookup table (LUT) that associates one or more ambient light levels to luminance modifications. Using the ambient light level as a key to the LUT, computing device 100 may determine one or more luminance modifications for the area of the image, applying the one or more luminance modifications to increase a luminance of the area of the image to potentially reduce or remove the noise due to the opto-electrical effect. Computing device 100 may then interface with pass-through display 110 to output the modified image.

Although described as applying the luminance modification to increase the luminance in the area of the image corresponding to pixels above or adjacent to UDS 120, computing device 110 may determine any form of luminance modification that may either increase or decrease the luminance of the area above and/or adjacent to UDS 120. Moreover, while described with respect to luminance modifications, computing device 110 may determine other types of modifications such as chromaticity modification, gamma modifications, saturation modifications, contrast modifications, and/or hue modifications to provide a few examples. In addition, while described as such modification being used to address passive opto-electrical effects resulting from ambient light, computing device 100 may apply such modifications to correct for active electromagnetic signals sent from UDS 120 itself.

Figure 2:
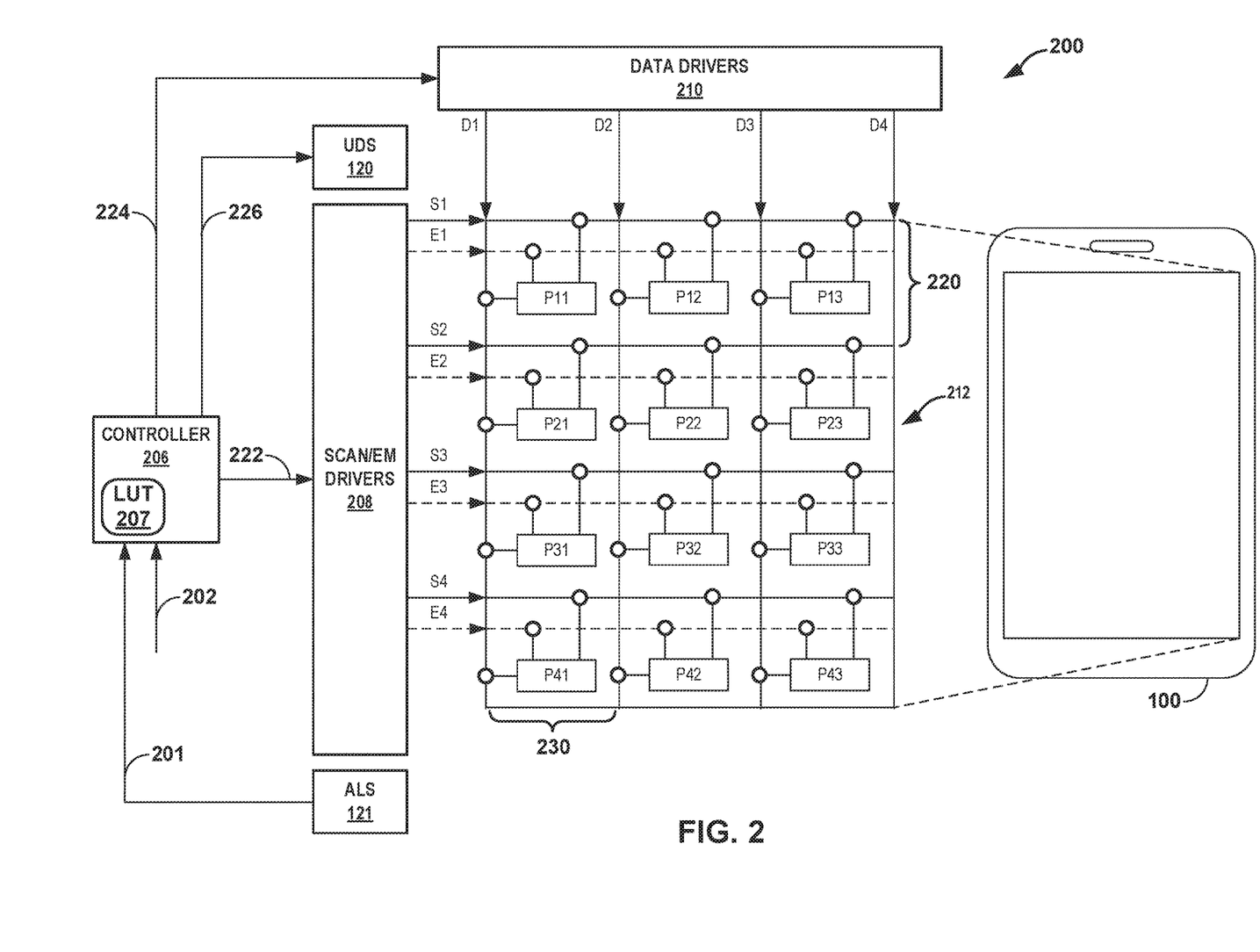
FIG. 2 is a diagram illustrating, in more detail, the computing device shown in the example of FIGS. 1A and 1B when configured to perform various aspects of the image modification techniques described in this disclosure.

FIG. 2 is a diagram illustrating, in more detail, the computing device shown in the example of FIGS. 1A and 1B when configured to perform various aspects of the image modification techniques described in this disclosure. As shown in the example of FIG. 2, display 200 may represent an example of display 110, where display 200 represents an OLED display system that includes an array 212 of light emitting pixels. Each light emitting pixel includes an OLED.

Drivers, including SCAN/EM drivers 208 and data drivers 210, may drive OLED display 200. SCAN/EM drivers 208 may be integrated, i.e., stacked, row line drivers. In some examples, SCAN/EM drivers 208 identifies a row of pixels in the display, and data drivers 210 provide data signals (e.g. voltage data) to the pixels in the selected row to cause the OLEDs to output light according to image data. Signal lines such as scan lines, EM lines, and data lines may be used in controlling the pixels to display images on the display. Though FIG. 2 illustrates OLED display 200 as having SCAN/EM drivers 208 on one side, SCAN/EM drivers 208 may be arranged on both left and right sides of OLED display 200 improving the driving performance (e.g.

speed), compared to when such drivers are placed on only the left side or only the right side of OLED display 200.

OLED display 200 includes pixel array 212 that includes a plurality of light emitting pixels, e.g., the pixels P11 through P43. A pixel is a small element on a display that can change color based on the image data supplied to the pixel. Each pixel within pixel array 212 can be addressed separately to produce various intensities of color. Pixel array 212 extends in a plane and includes rows and columns.

Each row extends horizontally across pixel array 212. For example, a first row 220 of the pixel array 212 includes pixels P11, P12, and P13. Each column extends vertically down the pixel array 212. For example, first column 230 of the pixel array 212 includes pixels P11, P21, P31, and P41. Only a subset of the pixels are shown in FIG. 2 for ease of illustration purposes and OLED display 200 may include hundreds, thousands, or millions of pixels (and possibly more in high resolution displays). In practice, there may be several million pixels in the pixel array 212. Greater numbers of pixels can result in higher resolution.

OLED display 200 includes SCAN/EM drivers 208 and data drivers 210. SCAN/EM drivers supply SCAN and EM signals to rows of pixel array 212. SCAN/EM drivers 208 supply, in the example of FIG. 2, scan signals via scan lines S1 to S4, and EM signals via EM lines E1 to E4, to respective rows of pixels. Data drivers 210 supply signals to columns of pixel array 212. In the example of FIG. 2, data drivers 210 supply data signals, via data lines D1 to D4, to the columns of pixels.

Each pixel in the pixel array 212 is addressable by a horizontal scan line and EM line, and a vertical data line. For example, pixel P11 is addressable by scan line S1, EM line E1, and data line D1. In another example, pixel P32 is addressable by scan line S3, EM line E3, and data line D2.

SCAN/EM drivers 208 and data drivers 210 provide signals to the pixels enabling the pixels to reproduce the image. SCAN/EM drivers 208 and data drivers 210 provide the signals to the pixels via the scan lines, the emission lines, and the data lines. To provide the signals to the pixels, SCAN/EM drivers 208 select a scan line and control the emission operation of the pixels. Data drivers 210 provides data signals to pixels addressable by the selected scan line to light the selected OLEDs according to the image data.

The scan lines are addressed sequentially for each frame. A frame is a single image in a sequence of images that are displayed. A scan direction determines the order in which the scan lines are addressed. In OLED display 200, the scan direction is from top to bottom of the pixel array 212. For example, scan line S1 is addressed first, followed by the scan lines S2, then S3, etc.

OLED display 200 includes a controller 206 that receives display input data 202. Controller 206 generates scan control signals 222 and data control signals 224 from display input data 202. Scan control signals 222 may drive SCAN/EM drivers 208. Data control signals 224 may drive the data drivers 210. Controller 206 controls the timing of the scan signals and EM signals through scan control signals 222. Controller 206 controls the timing of the data signals through the data control signals 224.

Controller 206 can also control the timing of UDS 120. Controller 206 can control the timing of UDS 120 through sensor control signals 226. Sensor control signals 226 may include start and stop signals. Controller 206 may send a start signal to UDS 120 to allow UDS 120 to emit electromagnetic radiation, e.g., an IR pulse. Controller 206 may send a stop signal to UDS 120 to cause UDS 120 to cease emitting electromagnetic radiation, or to prevent UDS 120 from emitting electromagnetic radiation.

Controller 206 may synchronize scan control signals 222, data control signals 224, and sensor control signals 226 to reduce interference between UDS 120 emissions and pixel light emissions. For example, controller 206 may synchronize sensor control signals 226 with scan control signals 222 to prevent UDS 120 from emitting electromagnetic energy during an EM signal pulse for pixel rows located near to UDS 120. Controller 206 may also synchronize sensor control signals 226 with scan control signals 222 to prevent UDS 120 from emitting electromagnetic radiation during a scan period for pixel rows located near to UDS 120.

In addition, controller 206 may interface with ALS 121 to determine an ambient light level 201. Such ambient light level 201 may indicate a level of ambient light in terms of nits, lux, or any other measure of ambient light. In any event, controller 206 may receive ambient light level 201 from ALS 121 and adapt image data 202 based on ambient light level 201.

For example, controller 206 may include a lookup table (LUT) 207 ("LUT 207") that associates one or more threshold levels of ambient light to one or more corresponding luminance modifications. Although described with respect to LUT 207, controller 206 may determine the luminance modifications (based on ambient light level 201) in one or more different ways, such as mathematically (e.g., using an equation), contextually (e.g., based on a given area of the image or other criteria), etc. As such, controller 206 may use any mapping or procedure by which to determine a luminance modification based on an ambient light level.

In any event, controller 206 may, using ambient light level 201 as a key, access LUT 207 to determine one or more luminance modifications. In some examples, LUT 207 may include various associations between ambient light level 201 and luminance modifications that may effectively represent thresholds. That is, LUT 207 may specify a mapping for an ambient light level below a certain activation threshold that provides for a luminance modification of zero (meaning that, in this example, no luminance modification is applied, or if applied, has no effect on an area of image data 202, thereby resulting in modified image data that is the same as image data 202). LUT 207 may effectively compare ambient light level 201 to the activation threshold, outputting the luminance modification of zero. Controller 206 may then refrain, if ambient light level 201 is below the activation threshold, from modifying the area of image data 202.

However, controller 206 may modify, if ambient light level 201 is equal to or greater than (or in other words above) the activation threshold, the area of image data 202. The activation threshold may be equal to, as one example, 10,000 lumens or the equivalent in lux. LUT 207 may however effectively implement multiple modification thresholds in which multiple different ambient light levels 201 are mapped to different luminance modifications. For example, the activation threshold may be 10,000 lumens, while the first modification threshold may be 20,000 lumens, and the second modification threshold may be above 20,000 lumens.

In this example, controller 206 may compare ambient light level 201 to the first modification threshold and the second modification threshold. If ambient light level 201 is above the first modification threshold but below the second modification threshold, controller 206 (via LUT 207) may determine a mid-level luminance modification (e.g., +2 luminance levels compared to the +1 luminance level modification when ambient light level 201 is above the activation threshold), and modify the area of image data 202 to increase a luminosity of the area of the image represented by image data 202. If ambient light level 201 is above both the first and the second modification threshold, controller 206 (via LUT 207) may determine a higher-level luminance modification (e.g., +3 luminance levels compared to the +2 luminance level modification when ambient light level 201 is above the first modification threshold), and modify the area of image data 202 to increase a luminosity of the area of the image represented by image data 202.

Although described as changing a luminosity of the area of image data 202 corresponding to the pixels of display panel 109 located above or adjacent to UDS 120, controller 206 may identify luminosity modifications for the area of image data 202 corresponding to pixels of display panel 109 that are not positioned above UDS 120. In this respect, controller 206 may determine luminosity modifications that decrease luminosity of pixels of display panel 109 that are not positioned above UDS 120 (where a single LUT 207 may be used for both use cases in that a negation operation may be performed with respect to a positive luminance change LUT to result in decrease luminance modifications).

In the example of FIG. 2, controller 206 is assumed to represent a display processor and/or integrated circuit configured to control display system 200. In such examples, controller 206 may modify the area of the image above and/or adjacent to UDS 120 to increase luminance of image data 202 or modify the are of the image that is not above and/or adjacent to UDS 120 to decrease luminance of image data 202, thereby obtaining modified image data used to determine signals 222, 224, and/or 226. When implemented using a display processor, controller 206 may modify the luminance in the are of image data 202 as a function of whole (meaning by multiples of one) or partial (e.g., half or quarter) luminance modification values.

Although described as being performed by a display processor, computing device 100 may perform various aspects of the techniques using a central processing unit (which may be referred to as an "application processor") and/or a graphics processing unit. In this example in which computing device 100 invokes an application processor and/or graphics processing unit to perform the modification of luminance values, the application processor and/or the graphics processing unit may modify the luminance in the area of image data 202 only as a function of whole luminance values.

Whether controller 206 represents the application processor/graphics processing unit or the display processor, controller 206 may modify the luminance values based on a proximity to UDS 120, meaning that pixels P11-P43 adjacent to UDS 120 may receive modified luminance values that are less than those luminance values provided to pixels P11-P43 directly over UDS 120 to enable some amount of blending of luminance values and decrease, possibly, user detectability of the various aspects of the techniques described herein (e.g., by decreasing banding and other image noise or artifacts surrounding UDS 120). LUT 207 may, as such, output different luminance modification values based on a location of each of pixels P11-P43, or controller 206 may adapt the luminance modification values based on a proximity of pixels P11-P43 to UDS 120.

Figure 3:
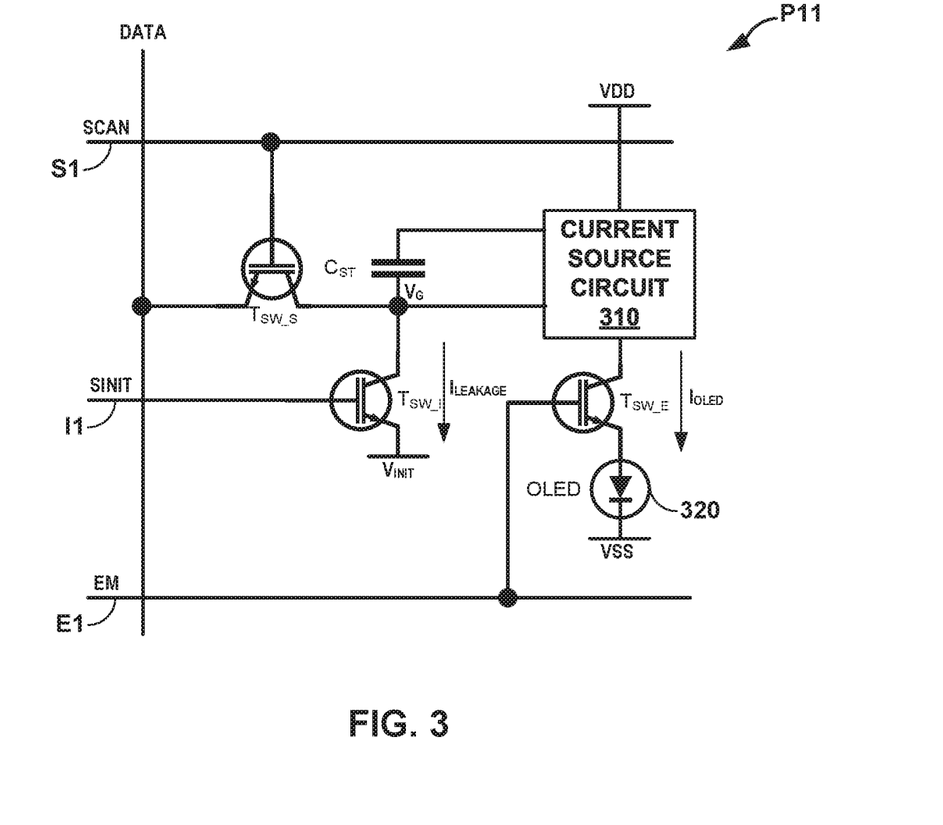
FIG. 3 is a diagram illustrating, in more detail, an example pixel circuit of a display system included in the computing device shown in the example of FIG. 2.

FIG. 3 is a diagram illustrating, in more detail, an example pixel circuit of a of an example pixel circuit of a display system included in the computing device shown in the example of FIG. 2. In the example of FIG. 3, pixel P11 of display system 200 (discussed above with respect to the example of FIG. 2) is shown in more detail. Pixel P11 represents an active matrix OLED (AMOLED) pixel. Pixel P11 is addressable by horizontal scan line S1, emission line E1, vertical data line D1, and initializing signal line I1. Pixel P11 receives a scan signal "SCAN" from scan line S1, a data voltage "DATA" from data line D1, and an emission signal "EM" from emission line E1. Pixel P11 also receives an initializing signal "SINIT" from an initial signal line I1. Pixel P11 receives power supply voltage VDD and an initial reference voltage $V_{INIT}$. Pixel P11 is connected to a common ground VSS.

Pixel P11 includes an organic light-emitting diode (OLED) 320. OLED 320 includes a layer of an organic compound that emits light in response to an electric current, $I_{OLED}$. The organic layer is positioned between two electrodes: an anode and a cathode. Current source circuit 310 receives the supply voltage VDD and generates the electric current, $I_{OLED}$ to drive OLED 320 to emit light.

Pixel P11 includes a storage capacitor $C_{ST}$. Storage capacitor $C_{ST}$ may maintain the gate voltage $V_G$ during illumination of pixel P11.

Pixel P11 also includes multiple p-channel switching thin film transistors (TFTs). The switching TFTs include a signal TFT ($T_{SW\_S}$), an initializing TFT ($T_{SW\_I}$), and an emission TFT ($T_{SW\_E}$).

During operation, switching TFT $T_{SW\_S}$ starts and stops the charging of the storage capacitor $C_{ST}$ based on receiving the SCAN signal from scan line S1. During an addressing period, scan line S1 turns on switching TFT $T_{SW\_S}$. Switching TFT $T_{SW\_S}$ provides the data voltage DATA from data line D1 to storage capacitor $C_{ST}$ and current source circuit 310.

Pixel P11 is programmed by the control signals: SCAN, SINIT, EM, and DATA. The OLED current, $I_{OLED}$, varies by the gate voltage $V_G$. When the gate voltage $V_G$ is steady, pixel P11 maintains a steady luminance throughout a frame time, displaying light corresponding to the supplied image data as programmed. A frame time, or frame period, is the amount of time between a start of a frame and a start of a next frame. The frame time can be the inverse of a frame rate of a display system. For example, a frame rate of 60 frames per second (fps) corresponds to a frame time of 1/60 seconds, or 0.0167 seconds.

When current source circuit 310 receives the data voltage DATA through switching TFT $T_{SW\_S}$, the current source circuit 310 provides a specified current $I_{OLED}$ to the OLED 320 based on the received data voltage DATA, such that OLED 320 emits light in accordance with the electric current $I_{OLED}$. The intensity or brightness of the emitted light depends on the amount of electrical current $I_{OLED}$ applied. A higher current can result in brighter light compared to a lower current, which results in a lower relative brightness. Thus, the intensity of the light emitted from OLED 320 is based on the data voltage DATA that corresponds to image data for the individual pixel. The storage capacitor $C_{ST}$ maintains the pixel state such that pixel P11 remains illuminated continuously after the addressing period.

Exposure to electromagnetic radiation (including such radiation as a result of the opto-electrical effect) may cause a leakage current $I_{leakage}$ to flow from storage capacitor $C_{ST}$ through TFT $T_{SW\_I}$. Leakage current $I_{leakage}$ may affect the OLED current $I_{OLED}$, causing changes to the illumination level of the pixel P11.

In the example of FIG. 3, it is assumed that transistor $T_{SW\_I}$ is a P-channel transistor (such as an P-channel metal-oxide-semiconductor field-effect transistor—MOSFET) in which the opto-electrical effect produces an increased off-state leakage current in the transistor switches of the pixel circuit that results in the voltage level change at terminals of capacitor $C_{ST}$ that result in a lower emission current, $I_{OLED}$, thereby reducing the luminance of pixel P11. As such, while described as decreasing the luminance of pixels presenting the area of the image directly over and/or adjacent to UDS 120, various aspects of the techniques may enable modification of the image directly over and/or adjacent to UDS 120 to decrease the luminance depending on the type of transistor used to form display panel 109.

In this respect, UDS 120 may sense signals through pass-through display 110, where such a design choice allows for an increase in the screen-to-body ratio of computing device 100. Because many UDS 120 use electromagnetic waves for sensing beyond pass-through display 110, back cover 112 may be removed for the area or region in which UDS 120 are located.

To correct for this higher $I_{LEAKAGE}$ current due to the opto-electric effects, controller 206 may determine ambient light level 201 via ALS 121. Controller 206 may then access, using ambient light level 201 as a key, LUT 207 to identify one or more luminance modifications. Controller 206 may then modify an area of image data 202 corresponding to pixels of display panel 109 positioned above and/or adjacent to UDS 120 (or alternatively, corresponding to pixels of display panel 109 that are not positioned above and/or adjacent to UDS 120, which may be referred to as the "remaining pixels of display panel 109") to obtain a modified output image. Controller 206 may then interface with display 110 to output the modified image data (using one or more of signals 222, 224, and/or 226.

Although FIG. 2 and FIG. 3 illustrate example components of an OLED display, the described techniques may be applied to any panel display that includes an array of pixels. For example, the process for reducing artifacts due to electromagnetic radiation or opto-electric effects may be applied to light emitting diode (LED) panels, liquid crystal displays (LCD), and plasma display panels (PDP).

Figure 4:
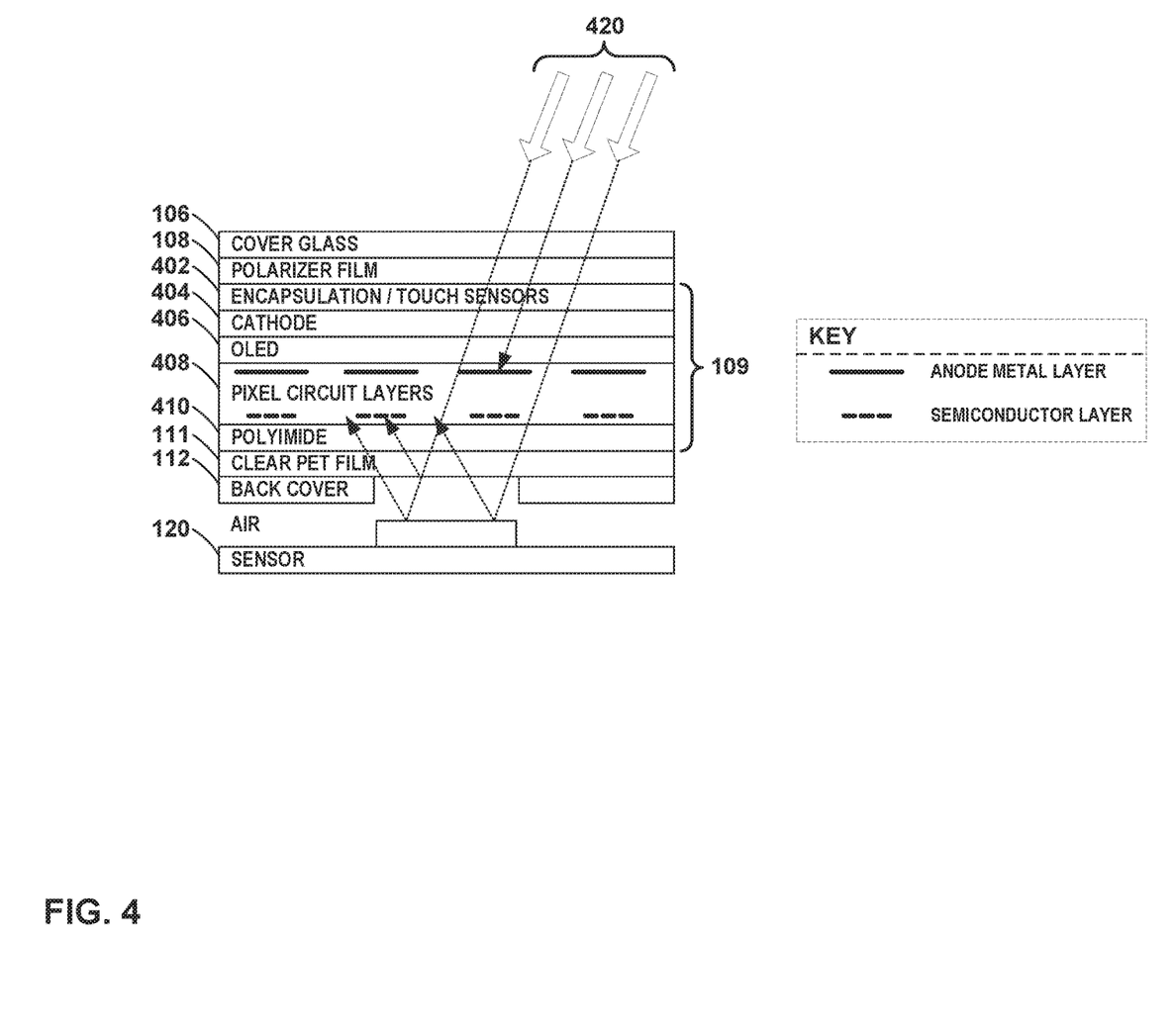
FIG. 4 is a diagram illustrating an example cross-sectional view of the computing device shown in the examples of FIG. 1A-2 in performing various aspects of the image modification techniques described in this disclosure.

FIG. 4 is a diagram illustrating an example cross-sectional view of the computing device shown in the examples of FIG. 1A-2 in performing various aspects of the image modification techniques described in this disclosure. As shown in the example of FIG. 4, the cross-sectional view of computing device 100 includes the arrangement of various elements of display 110, where display panel 109 has been expanded to show an arrangement of encapsulation/touch sensors 402, cathode 404, OLED 406, pixel circuit layers 408, polyimide 410. Encapsulation/touch sensors 402 may be disposed above cathode 404, which itself is disposed above OLED 406. OLED 406 is disposed above pixel circuit layers 408.

Pixel circuit layer 408 includes an anode metal layer to shield or otherwise obstruct light from entering and thereby interfering with a semiconductor layer. However, such anode metal layer is fragmented to allow sensor signals to be received by and emitted from UDS 120. Pixel circuit layer 408 also includes a semiconductor layer formed by one or more of transistors $T_{SW\_P}$, $T_{SW\_S}$, and/or $T_{SW\_E}$, capacitor $C_{ST}$, and current source circuit 310. Pixel circuit layers 408 is disposed above polyimide 410.

As further shown in the example of FIG. 4, both UDS 120 and clear PET film 111 (although with less reflectivity than UDS 120) may reflect light 420 back into the unprotected bottom side of pixel circuit layer 408 (which is unprotected in the sense that no anode metal layer exists at the bottom of pixel circuit layers 408). As such, the unprotected bottom side of pixel circuit layers 408 may incur opto-electrical effects due to off-angle (not direct), or in other words, high incident angle, light 420. Thin film transistors (TFTs) may be susceptible to opto-electrical effects when not shielded from reflections that occur because back cover 112 has been omitted over UDS 120, where TFTs may be used to support pixel circuit layers 408 (used to perform the switching required in the example of FIG. 3 by transistors $T_{SW\_P}$, $T_{SW\_S}$, and/or $T_{SW\_E}$).

As high incident angle light 420 may impact adjacent pixels of pixel circuit layers 408, controller 206 may modify, based on ambient light level 201, a portion of the image surrounding the area of image data 202, where the portion of image data 202 corresponds to pixels of pixel circuit layer 408 positioned adjacent to UDS 120. That is, the high incident angle light 420 may reflect to pixels located adjacent to pixels positioned directly above UDS 120, such that the reflected electromagnetic waves are injected not just to pixels positioned directly above UDS 120 but to those located proximate to (or possibly adjacent to) UDS 120. LUT 207 may store luminance modifications for such locations proximate to (or possibly adjacent to) UDS 120 that are less than those (or greater than those—for N-channel MOSFETs) specified for pixels directly above UDS 120. In this respect, at the edges, controller 206 may gradually change the luminance modification to improve visual clarity and potentially the viewing experience (by, for example, reducing locally dimming, banding, etc.).

While described with respect to glass cover 106, various aspects of the techniques may be performed with respect to plastic covers or covers formed from other materials. However, it should be understood that each material used for a cover may have different optical capabilities that result in different luminance or other modifications, thereby altering the associations represented by LUT 207. Likewise, different materials for polarizer film 108 and other components of display panel 109, clear PET film 111, and back cover 112 may result in different luminance modifications.

Figure 5:
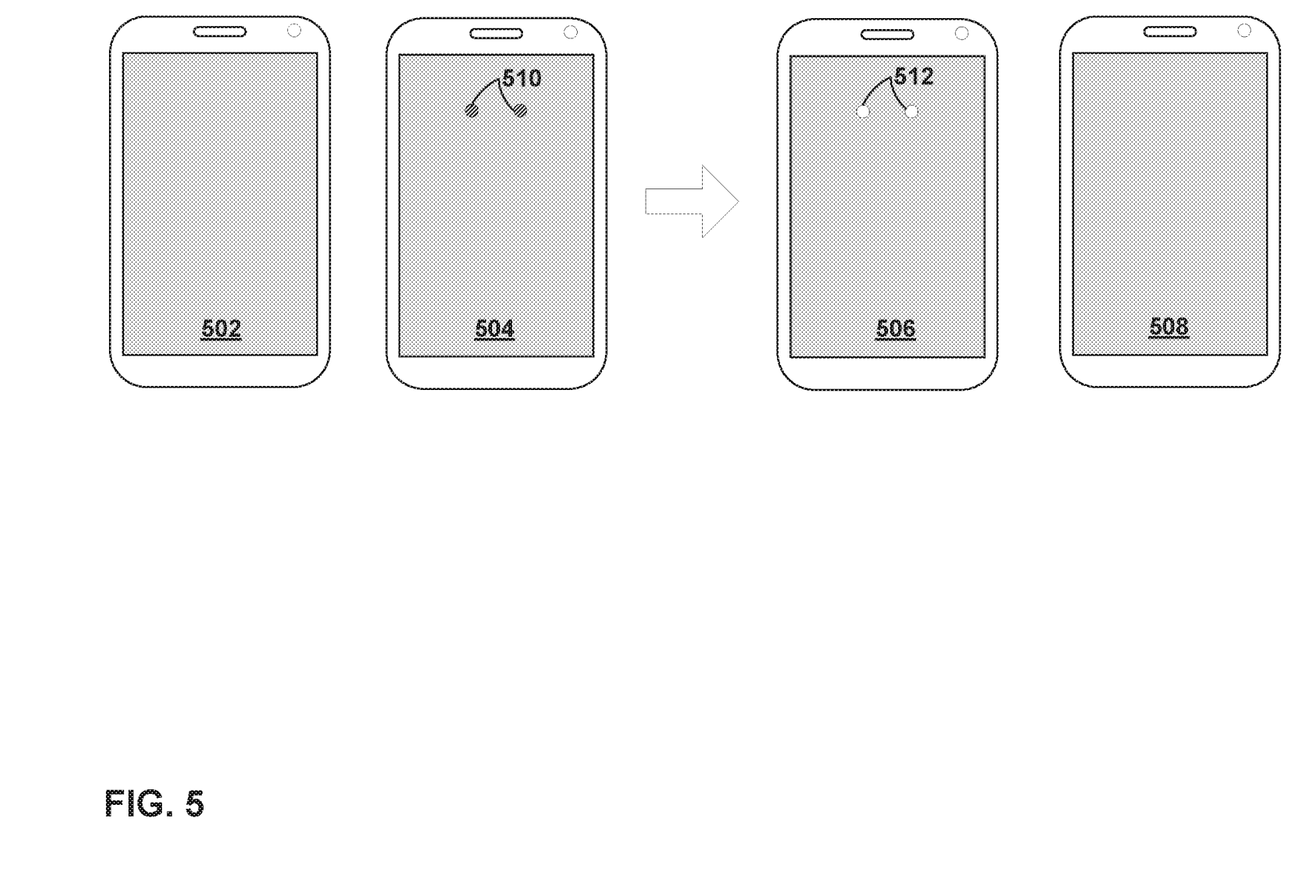
FIG. 5 is a diagram illustrating modification of an image by the computing device of FIGS. 1A-2 in accordance with various aspects of the image modification techniques described in this disclosure.

FIG. 5 is a diagram illustrating modification of an image by the computing device of FIGS. 1A-2 in accordance with various aspects of the image modification techniques described in this disclosure. In the example of FIG. 5, referring first to the far-left, computing device 100 obtain an all light gray image 502, where controller 206 receives image data 202 representative of a light gray image 502. Controller 206 may present image data 202 representative of light gray image 502 by interfacing with pass-through display 110 to present image data 504 having two (in this instance) dark grey circles 510 absent modification to correct for the opto-electrical effect discussed in more detail above.

Instead, controller 206 may modify, based on ambient light level 201, the luminance value of the area in image data 202 corresponding to pixels in display panel 109 above and/or adjacent to UDS 120 and thereby obtain image 506 that includes two white circles 512 (compared to dark grey circles 510). Two white circles 512 were modified to offset dark grey circles 510, where controller 206 may access LUT 207, based on ambient light level 201, to identify a luminance medication that results in white circles 512 in the area of image data 506 that corresponds to pixels positioned over and/or adjacent to UDS 120. Controller 206 may then interface with display system 200 to present modified image data 506, which results in output of a uniformly light grey image 508 that may, in some examples, more accurately reflect light gray image 502.

Although not described in this disclosure, for ease of illustration purposes, various aspects of the image modification techniques may enable computing device 100 to analyze image data 202 prior to performing modification.

For example, controller 206 may analyze image data 202 to determine an average grey level of image data 202, where controller 206 may determine a different luminance modification based on the average grey level. That is, when image data 202 has an average grey level at or below a threshold grey level, controller 206 may refrain from modifying image data 202 as the modification may increase noise for certain lower grey levels. As such, there may be different levels of luminance modification for different levels or thresholds of average grey levels.

Figure 6:
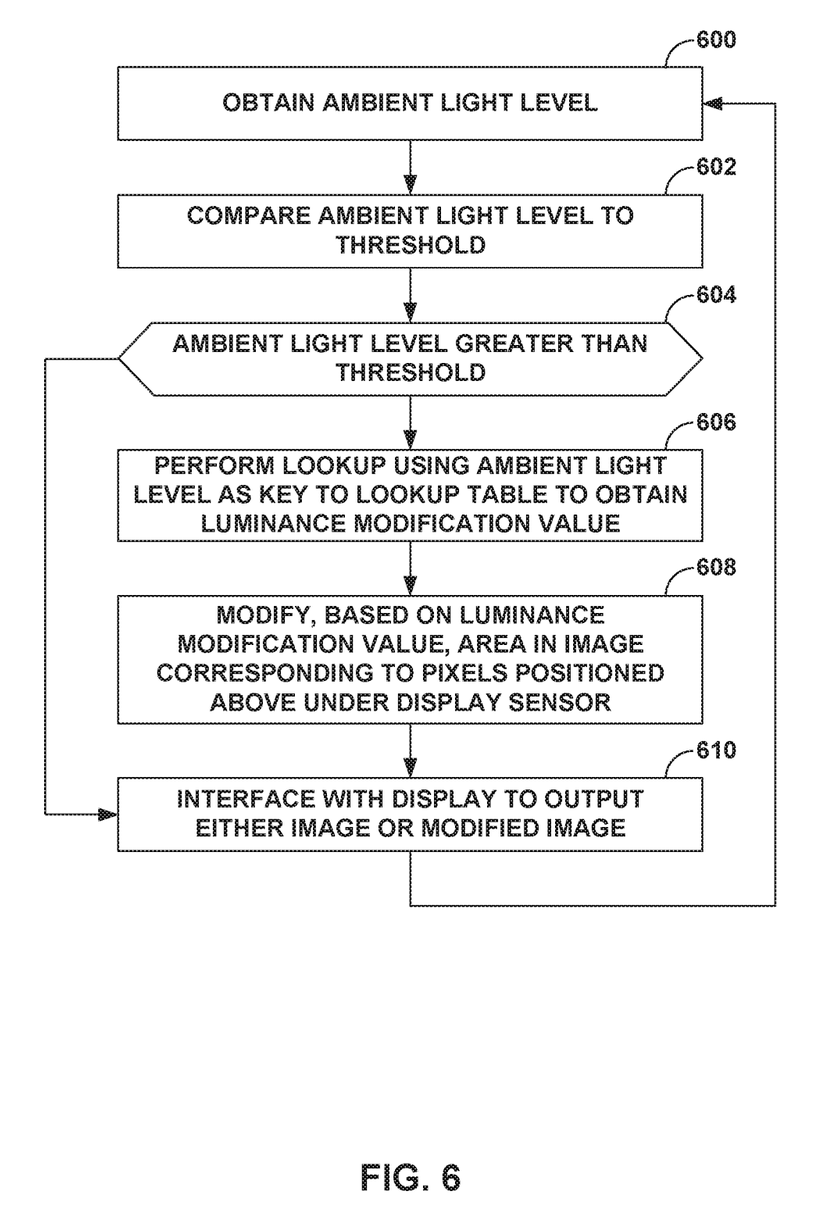
FIG. 6 is a flowchart illustrating example operation of the controller shown in the example of FIG. 2 in performing various aspects of the image modification techniques described in this disclosure.

FIG. 6 is a flowchart illustrating example operation of the controller shown in the example of FIG. 2 in performing various aspects of the image modification techniques described in this disclosure. Controller 206 may initially interface with ALS 121 to obtain ambient light level 201 (600). Controller 206 may next, when assumed to represent one or more of an application processor and graphics processing unit (GPU), pre-process image data 202 based on ambient light level 201. That is, controller 206 may compare ambient light level 201 to a threshold (which is referred to above as an activation threshold) (602) and modify, based on the comparison, an area of image data 202 to obtain a modified image.

For example, when ambient light level 201 is greater than the activation threshold ("YES" 604), controller 206 may, again assuming controller 206 represents one or more of the application processor and GPU, perform a lookup in LUT 207 using ambient light level 201 as a key to obtain a luminance modification value associated with ambient light level 201 (606). Controller 206 may then modify, based on the luminance modification value, the area in image data 202 corresponding to pixels positioned above UDS 120 (608). Controller 206 may then interface with display system 200 to output either (if ambient light level 201 is not greater than the activation threshold—"NO" 604) image data 202 or the modified image (610).

The foregoing assumed that controller 206 represents one or more of an application processor and a GPU. In some instances, controller 206 may represent a display processor, where one or more of the application processor and GPU may still obtain image data 202, compare ambient light level 201 to the activation threshold, and perform the lookup in LUT 207 using the ambient light level 201 as a key to obtain a luminance modification value.

However, rather than perform pre-processing or other modifications directly to image data 202, the one or more of the application processor and GPU may provide an indication of image data 202, the luminance modification value, and the opening location/size (dimensions) in back cover 112 to controller 206 via a display driver. Controller 206 (which again is assumed to represent a display processor—which may in some instances be an integrated circuit) may receive the indications of the image data 202, the luminance modification value, and the opening location/size and modify voltages of the data signals (e.g., D1-D4) to vary the luminance of the underlying pixels. Controller 206 may modify such signals to change the luminance value of the area of the image corresponding to pixels directly above UDS 120 or corresponding to the remaining pixels not directly above UDS 120. Modification of the data signals themselves may allow for more subtle luminance changes (partial luminance values, such as a quarter or half luminance value) rather than being fixed to whole luminance values when modification occurs to image data 202 directly.

Various aspects of the techniques may enable the following clauses.

Clause 1. A computing device comprising: a display; one or more sensors positioned underneath the display, the display configured to allow the one or more sensors to operate through the display; and one or more processors configured to: determine an ambient light level; modify, based on the ambient light level, an area of an image to obtain a modified image, the area of the image corresponding to pixels of the display positioned above the one or more sensors or corresponding to pixels of the display that are not positioned above the one or more sensors; and interface, with the display, to output the modified image.

Clause 2. The computing device of clause 1, wherein the display comprises an organic light-emitting diode display (OLED) configured to allow the one or more sensors to operate through the OLED display via omission of back cover material from an area of a back cover of the OLED display above the one or more sensors.

Clause 3. The computing device of claim 1, wherein the one or more processors comprise one or more of an application processor and a graphics processing unit, and wherein the one or more of the application processor and the graphics processing unit are configured to modify a luminance in the area of the image to obtain the modified image.

Clause 4. The computing device of clause 3, wherein the one or more of the application processor and the graphics processing unit are configured to modify the luminance in the area of the image only as a function of whole luminance values.

Clause 5. The computing device of clause 1, wherein the one or more processors comprise a display processor, and wherein the display processor is configured to modify a luminance in the area of the image to obtain the modified image.

Clause 6. The computing device of clause 5, wherein the display processor is configured to modify the luminance in the area of the image as a function of whole luminance values or as a function of partial luminance values.

Clause 7. The computing device of clause 1, wherein the one or more processors are configured to: compare the ambient light level to an activation threshold; refrain, if the ambient light level is below the activation threshold, from modifying the area of the image; and modify, if the ambient light level is above the activation threshold, the area of the image to obtain the modified image.

Clause 8. The computing device of clause 1, wherein the one or more processors are configured to: compare the ambient light level to a first modification threshold and a second modification threshold; modify, if the ambient light level is above the first modification threshold but below the second modification threshold, the area of the image to change a luminosity of the area of the image by a first value; and modify, if the ambient light level is above the first modification and the second modification threshold, the area of the image to change a luminosity of the area of the image by a second value greater than the first value.

Clause 9. The computing device of clause 1, wherein the one or more processors are further configured to modify, based on the ambient light level, a portion of the image surrounding the area of the image, the portion of the image corresponding to pixels of the display positioned adjacent to the one or more sensors.

Clause 10. The computing device of clause 1, further comprising an ambient light sensor configured to obtain the ambient light level.

Clause 11. The computing device of clause 1, wherein the display comprises one or more p-channel transistors susceptible to opto-electrical effects that result in a decrease in luminosity in the pixels corresponding to the area of the image.

Clause 12. The computing device of clause 1, wherein the display comprises one or more n-channel transistors susceptible to opto-electrical effects that result in an increase in luminosity in the pixels corresponding to the area of the image.

Clause 13. A method comprising: determining, by one or more processors, an ambient light level; modifying, by the one or more processors and based on the ambient light level, an area of an image to obtain a modified image, the area of the image corresponding to pixels of display positioned above one or more sensors or corresponding to pixels of the display that are not positioned above the one or more sensors, the display configured to allow the one or more sensors to operate through the display; and interfacing, with the display, to output the modified image.

Clause 14. The method of clause 13, wherein the display comprises an organic light-emitting diode display (OLED) configured to allow the one or more sensors to operate through the OLED display via omission of back cover material from an area of a back cover of the OLED display above the one or more sensors.

Clause 15. The method of clause 13, wherein the one or more processors comprise one or more of an application processor and a graphics processing unit, and wherein modifying the area of the image comprises modifying, by one or more of the application processor and the graphics processing unit, a luminance in the area of the image to obtain the modified image.

Clause 16. The method of clause 15, wherein modifying the luminance in the area of the image comprises modifying, by the one or more of the application processor and the graphics processing unit, the luminance in the area of the image only as a function of whole luminance values.

Clause 17. The method of clause 13, wherein the one or more processors comprise a display processor, and wherein modifying the area of the image comprises modifying, by the display processor, a luminance in the area of the image to obtain the modified image.

Clause 18. The method of clause 17, wherein modifying the luminance in the area of the image comprises modifying, by the display processor, the luminance in the area of the image as a function of whole luminance values or as a function of partial luminance values.

Clause 19. The method of clause 13, wherein modifying the area in the image comprises: comparing the ambient light level to an activation threshold; refraining, if the ambient light level is below the activation threshold, from modifying the area of the image; and modifying, if the ambient light level is above the activation threshold, the area of the image to obtain the modified image.

Clause 20. The method of clause 13, wherein modifying the area in the image comprises: comparing the ambient light level to a first modification threshold and a second modification threshold; modifying, if the ambient light level is above the first modification threshold but below the second modification threshold, the area of the image to change a luminosity of the area of the image by a first value; and modifying, if the ambient light level is above the first modification and the second modification threshold, the area of the image to change a luminosity of the area of the image by a second value greater than the first value.

Clause 21. The method of clause 13, further comprising modifying, based on the ambient light level, a portion of the image surrounding the area of the image, the portion of the image corresponding to pixels of the display positioned adjacent to the one or more sensors.

Clause 22. The method of clause 13, wherein obtaining the ambient light level comprises interfacing with an ambient light sensor configured to obtain the ambient light level.

Clause 23. The method of clause 13, wherein the display comprises one or more p-channel transistors susceptible to opto-electrical effects that result in a decrease in luminosity in the pixels corresponding to the area of the image.

Clause 24. The method of clause 13, wherein the display comprises one or more n-channel transistors susceptible to opto-electrical effects that result in an increase in luminosity in the pixels corresponding to the area of the image.

Clause 25. A non-transitory computer-readable storage media having stored thereon instructions that, when executed, cause one or more processors to: determine an ambient light level; modify, based on the ambient light level, an area of an image to obtain a modified image, the area of the image corresponding to pixels of display positioned above one or more sensors or corresponding to pixels of the display that are not positioned above the one or more sensors, the display configured to allow the one or more sensors to operate through the display; and interface, with the display, to output the modified image.

Embodiments of the subject matter and the functional operations described in this specification can be implemented in any suitable electronic device such as a personal computer, a mobile telephone, a smart phone, a smart watch, a smart TV, a mobile audio or video player, a game console, or a combination of one or more of these devices.

The computing device may include various components such as a memory, a processor, a display, and input/output units. The input/output units may include, for example, a transceiver which can communicate with the one or more networks to send and receive data. The display may be any suitable display including, for example, a cathode ray tube (CRT), liquid crystal display (LCD), or light emitting diode (LED) display, for displaying images.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

One or more aspects of the techniques may be implemented as one or more computer program products, e.g., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both.

Elements of a computer may include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer may not have such devices. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A computing device comprising:
a display;
one or more sensors positioned underneath the display, the display configured to allow the one or more sensors to operate through the display; and
one or more processors configured to:
determine an ambient light level;
modify, based on the ambient light level and based on optical artifacts in images output by the display that are introduced due to positioning of the one or more sensors underneath the display, an area of an image to obtain a modified image, the area of the image corresponding to pixels of the display positioned above the one or more sensors or corresponding to pixels of the display that are not positioned above the one or more sensors; and
interface, with the display, to output the modified image.

2. The computing device of claim 1, wherein the display comprises an organic light-emitting diode display (OLED) configured to allow the one or more sensors to operate through the OLED display via omission of back cover material from an area of a back cover of the OLED display above the one or more sensors.

3. The computing device of claim 1,
wherein the one or more processors comprise one or more of an application processor and a graphics processing unit, and
wherein the one or more of the application processor and the graphics processing unit are configured to modify a luminance in the area of the image to obtain the modified image.

4. The computing device of claim 3, wherein the one or more of the application processor and the graphics processing unit are configured to increase or decrease the luminance in the area of the image only by whole luminance values.

5. The computing device of claim 1,
wherein the one or more processors comprise a display processor, and
wherein the display processor is configured to modify a luminance in the area of the image to obtain the modified image.

6. The computing device of claim 1, wherein the one or more processors are configured to:
compare the ambient light level to an activation threshold;
refrain, if the ambient light level is below the activation threshold, from modifying the area of the image; and
modify, if the ambient light level is above the activation threshold, the area of the image to obtain the modified image.

7. The computing device of claim 1, wherein the one or more processors are configured to:
- compare the ambient light level to a first modification threshold and a second modification threshold;
- modify, if the ambient light level is above the first modification threshold but below the second modification threshold, the area of the image to change a luminosity of the area of the image by a first value; and
- modify, if the ambient light level is above the first modification and the second modification threshold, the area of the image to change a luminosity of the area of the image by a second value greater than the first value.

8. The computing device of claim 1, wherein the one or more processors are further configured to modify, based on the ambient light level, a portion of the image surrounding the area of the image, the portion of the image corresponding to pixels of the display positioned adjacent to the one or more sensors.

9. The computing device of claim 1, further comprising an ambient light sensor configured to obtain the ambient light level.

10. The computing device of claim 1, wherein the display comprises one or more p-channel transistors susceptible to opto-electrical effects.

11. The computing device of claim 1, wherein the display comprises one or more n-channel transistors susceptible to opto-electrical effects.

12. The computing device of claim 1, wherein the optical artifacts change in appearance as a function of the ambient light level.

13. The computing device of claim 1, wherein, to modify the area of the image, the one or more processors are configured to modify the area of the image to reduce a visual appearance of the optical artifacts when the modified image is output.

14. A method comprising:
- determining, by one or more processors, an ambient light level;
- modifying, by the one or more processors and based on the ambient light level and to reduce optical artifacts in images output by a display positioned above one or more sensors that are introduced due to inclusion of the one or more sensors, an area of an image to obtain a modified image, the area of the image corresponding to pixels of the display positioned above the one or more sensors or corresponding to pixels of the display that are not positioned above the one or more sensors, the display configured to allow the one or more sensors to operate through the display; and
- interfacing, with the display, to output the modified image.

15. The method of claim 14, wherein the display comprises an organic light-emitting diode display (OLED) configured to allow the one or more sensors to operate through the OLED display via omission of back cover material from an area of a back cover of the OLED display above the one or more sensors.

16. The method of claim 14,
- wherein the one or more processors comprise one or more of an application processor and a graphics processing unit, and
- wherein modifying the area of the image comprises modifying, by one or more of the application processor and the graphics processing unit, a luminance in the area of the image to obtain the modified image.

17. The method of claim 16, wherein modifying the luminance in the area of the image comprises increasing or decreasing, by the one or more of the application processor and the graphics processing unit, the luminance in the area of the image only by whole luminance values.

18. The method of claim 14,
- wherein the one or more processors comprise a display processor, and
- wherein modifying the area of the image comprises modifying, by the display processor, a luminance in the area of the image to obtain the modified image.

19. The method of claim 14, wherein modifying the area in the image comprises:
- comparing the ambient light level to an activation threshold;
- refraining, if the ambient light level is below the activation threshold, from modifying the area of the image; and
- modifying, if the ambient light level is above the activation threshold, the area of the image to obtain the modified image.

20. A non-transitory computer-readable storage media having stored thereon instructions that, when executed, cause one or more processors to:
- determine an ambient light level;
- modify, based on the ambient light level and based on optical artifacts in images output by a display positioned above one or more sensors that are introduced due to inclusion of the one or more sensors, an area of an image to obtain a modified image, the area of the image corresponding to pixels of the display positioned above the one or more sensors or corresponding to pixels of the display that are not positioned above the one or more sensors, the display configured to allow the one or more sensors to operate through the display; and
- interface, with the display, to output the modified image.

* * * * *